United States Patent [19]

Bodine, Sr.

[11] Patent Number: 4,941,690

[45] Date of Patent: Jul. 17, 1990

[54] TUBING CLAMP ASSEMBLY

[76] Inventor: Robert L. Bodine, Sr., 1204 W. Washington St., Lot 7, E. Peoria, Ill. 61611

[21] Appl. No.: 369,624

[22] Filed: Jun. 21, 1989

[51] Int. Cl.⁵ .............................................. F16L 35/00
[52] U.S. Cl. ....................................... 285/38; 285/39; 285/382.2
[58] Field of Search ................... 285/382.2, 424, 419, 285/38, 39

[56] References Cited

U.S. PATENT DOCUMENTS

| | | | |
|---|---|---|---|
| 1,604,211 | 10/1926 | Williams | 285/38 X |
| 2,190,419 | 2/1940 | Evarts | 285/38 X |
| 2,719,345 | 10/1955 | Riker | |
| 3,984,134 | 10/1976 | Engman et al. | 285/382.2 |
| 4,147,384 | 4/1979 | Heckethorn | 285/382.2 |
| 4,388,749 | 6/1983 | Sassak | 285/382.2 |
| 4,426,761 | 1/1984 | Sassak | 285/382.22 |

Primary Examiner—Dave W. Arola
Attorney, Agent, or Firm—Sixbey, Friedman, Leedom & Ferguson

[57] ABSTRACT

A reusable two-part tubing clamp made of stainless steel has a plurality of circumferentially continuous knife edges that deform the joined tubes to form a series of seals along the length of the tubes. A tab on each side of the clamp extends inwardly so that the generally circular area inside the clamp has two flattened sides. The two parts of the clamp are drawn together by tightening combination wing-square nuts onto separate Allen-head screws which pass through holes in each of the two clamp parts.

11 Claims, 2 Drawing Sheets

TUBING CLAMP ASSEMBLY

BACKGROUND

This invention relates to the field of tubing clamps such as the clamps used to secure the components of internal combustion engine exhaust systems.

Exhaust system components are generally connected by sliding a pipe segment of smaller diameter (such as a segment attached to a muffler) into the end of an exhaust pipe and tightening a clamp on the overlapping portions of pipe. Several problems have been associated with the prior-art clamps used to connect exhaust system components, including problems of adequate joint sealing, and problems in installing and removing the clamps when an exhaust system component is to be replaced.

It is important that clamps used to connect the pipes seal the joint completely to prevent escape of poisonous exhaust gases and objectionable exhaust noise. To accomplish this objective, some clamp designers have designed clamps that beform both the inner and outer pipes around their entire circumference to interlock the pipes. A clamp of this type is described in U.S. Pat. No. 4,388,749 to Sassak. The single, blunt deforming edge used in this type of clamp may not seal the joint adequately in cases where the inner and outer pipes do not mate perfectly.

U.S. Pat. No. 2,719,345 to Riker shows a tubing clamp having a single sharp edge abutting a portion of the outer pipe. This sharp edge compresses the outer pipe and appears to produce a more pronounced interlocking than goes a blunt edge. Nevertheless, clamps of this type may not be adequate to seal the joint since the sharp edge does not continue around the circumference of the pipe. A novel and unique clamp with a plurality of sharp edges continuing around the circumference of the pipe which form a series of pronounced seals between the inner and outer pipes would offer a significant advantage.

There have also been problems in installing and removing prior-art clamps. These clamps generally have a circular section around the pipes, and the nuts for tightening the clamp mount on threads lying in a line tangential to the circumference of the outer pipe. Thus, tightening of the nuts creates a torquing force about the central axis of the joined pipes, tending to cause rotation of the clamp about the said central axis during tightening. A novel and unique clamp with a modified circular section around the pipes, and also having nuts that can be tightened first by hand and then by using a wrench, would offer a significant advantage.

Removing prior clamps is difficult because prior art clamps have generally been constructed of ordinary steel. When mounted under a motor vehicle, these clamps quickly corrode so that they cannot be removed except with a cutting torch. These cutting operations are dangerous because the hot torch flame must be used in the area of the gas tank and greased chassis parts. There is also a constant risk of injury to the operator inherent in using a torch, while the heat will damage metal parts of the vehicle. Applying extreme heat to the exhaust pipes and/or the underbody of the vehicle will harden these metal parts, making them brittle. This heat will cause particular damage to the stainless steel exhaust pipes which are standard equipment on many vehicles. If the parts involved are galvanized to prevent corrosion, extreme heat may destroy the effectiveness of the galvanitic treatment and lead to premature failure of the metal. Thus, there is a need for a tubing clamp which can be removed from the exhaust system of a vehicle without cutting operations.

SUMMARY OF THE INVENTION

It is a general object of the present invention to provide a novel and improved tubing clamp which provides joint sealing superior to the sealing of prior art devices, and which can be installed, removed, and reused easily.

A specific object of the present invention is to provide a novel and improved tubing clamp having one or more sharp edges which, upon tightening of the clamp, deforms the entire circumference of two tubes joined by the clamp to form one or more pronounced seals between the two tubes.

Another object of the present invention is to provide a novel and improved tubing clamp having one or more sharp edges which, upon tightening of the clamp, deforms the entire circumference of two cylindrical tubes and flattens opposing regions so that the tubes are interlocked and sealed together and so that the clamp will not rotate with respect to the tubes.

A further object of the present invention is to provide a novel and improved tubing clamp which is constructed of stainless steel to increase corrosion resistance and lifespan.

Yet another object of the present invention is to provide a novel and improved tubing clamp for connecting tubes which is mounted on the tubes by nuts adapted to be tightened not only by hand but also by using a wrench.

Another object of the present invention is to provide a novel and improved tubing clamp which can be removed without using a torch.

These objects and others are achieved by providing a reusable two-part tubing clamp made of stainless steel having a plurality of circumferentially continuous knife edges that deform the joined tubes to form a series of seals along the length of the tubes. A tab on each side of the clamp extends inwardly so that the generally circular area inside the clamp has two flattened sides. The two parts of the clamp are drawn together by tightening combination wing-square nuts onto separate Allen-head screws which pass through holes in each of the two clamp parts.

DETAILED DESCRIPTION OF THE PREFERRED EMBODIMENT

Figure 1:
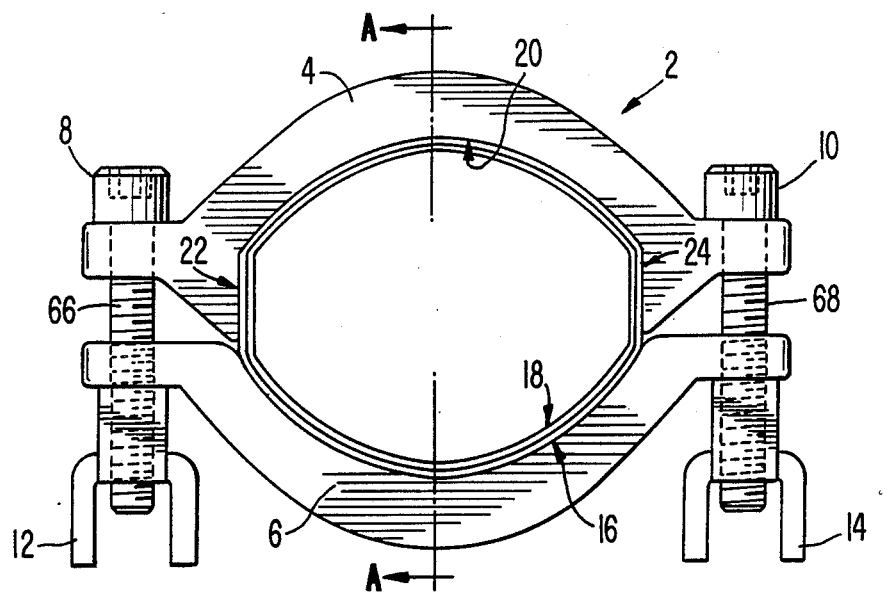
FIG. 1 is an end elevational view of the tubing clamp of invention.

Referring first to FIG. 1, the tubing clamp of the present invention is shown generally at 2. The tubing clamp comprises a top half 4 and a bottom half 6 held together by Allen head bolts 8 and 10 which are secured by wing/square nuts 12 and 14 to clamp an overlapping portion of an outer tube 16 and an inner tube 18 that slides in telescoping relationship into the end of outer tube.

Figure 2:
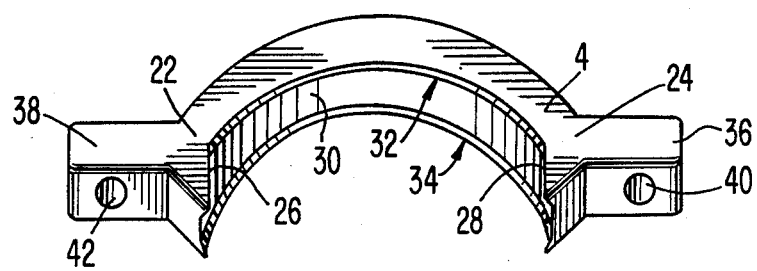
FIG. 2 is a perspective view of the top half of the tubing clamp.

Referring now to FIG. 2, the top half 4 of tubing clamp 2 is formed as a single piece of material and has an arcuate surface section 20 of continuous and generally semi-circular curvature. The radius of curvature of arcuate surface section 20 is selected to be slightly smaller than the radius of curvature of the outer tube 16 so that when the tubing clamp 2 is tightened on the assembled outer tube 16 and inner tube 18 (shown in FIG. 1), the inner tube 18 and outer tube 16 will be deformingly engaged as will explained later in more detail.

The free ends of the arcuate surface section 20 for the top half 4 are provided with extender tabs 22 and 24 having relatively flat inside surface sections 26 and 28 facing the clamped tubes 16 and 18 (shown in FIG. 2). The inside surface sections 26 and 28 of extender tabs 22 and 24 act with the arcuate surface section 20 to form a gripping surface 30 facing tubes 16 and 18 which has an arcuate section with oppositely disposed flat end sections. In the embodiment shown, the top half 4 has formed, along the edges of gripping surface 30, two continuous projecting, parallel sharp edges 32 and 34. These sharp edges project outwardly beyond the surface sections 20, 26 and 28 on opposite sides thereof. Ears 36 and 38 extend from the main body of the top half 4 and are provided With bolt holes 40 and 42 respectively which receive the Allen head bolts 8 and 10.

Figure 3:
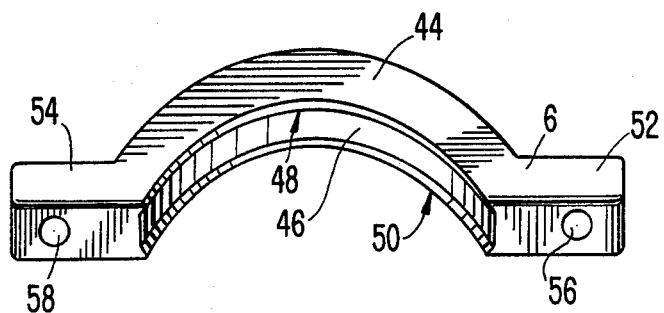
FIG. 3 is a perspective view of the bottom half of the tubing clamp.

FIG. 3 shows the bottom half 6 of tubing clamp 2. Bottom half 6 has a body portion 44 which has an arcuate gripping surface 46 facing the tubes 16 and 18 (shown in FIG. 1). The gripping surface 46 is curved to substantially match the curvature of the surface section 20. Like the gripping surface 30 of the top half 4, the gripping surface 46 is bordered by two continuous, projecting, parallel sharp edges, shown at 48 and 50. These edges are similar in design and spacing to the sharp edges 32 and 34 of top half 4 so that when top half 4 is assembled to bottom half 6, the sharp edges 32, 34, 48, and 50 act together to form two substantially continuous and parallel sharp edges around the circumference of tubes 16 and 18 which face inwardly toward the tubes. The bottom half 6 has ears 52 and 54 extending from its body portion, the ears being provided with bolt holes 56 and 58 respectively. The bolt holes are sized to receive Allen head bolts 8 and 10.

Figure 4:
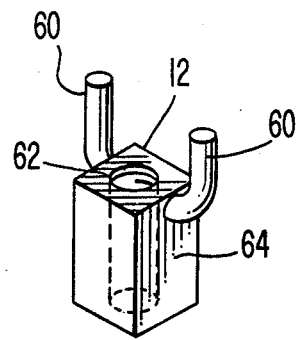
FIG. 4 is a perspective view of the combination wing-square nut used on the tubing clamp of the present invention.

The wing/square nut 12 (which is identical to wing/square nut 14) is detailed in FIG. 4. In the preferred embodiment shown, the nut 12 has two wings 60 which extend upward from a shank 64 through which is provided a threaded hole 62. The wings 60 are sized and shaped so that a worker may rotate the nut by pressing his or her fingers and thumb against the sides of wings 60 as is done with a conventional wing nut. The threaded hole 62 is threaded to receive the Allen head bolt 8. The shank 64 is preferably provided with at least one pair of opposed, parallel flat sides. In the preferred embodiment shown, there are four flat sides on shank 64, but there could also be two, six, eight, or more sides. As will be apparent to those skilled in the art, the nut 12 can be turned with any of a number of conventional wrenches. Thus, the clamp 2 can be tightened first by hand and then using a wrench without causing any rotation of the clamp relative to the tubes 16 and 18.

In operation, the top half 4 of tubing clamp 2 and the Allen head bolts 8 and 10 are placed around outer tube 16 so that the extender tabs 22 and 24 contact the outer tube. The bottom half 6 of tubing clamp 2 is then assembled to Allen head bolts 8 and 10 and wing/square nuts 12 and 14 are started onto bolts 8 and 10 respectively by hand.

As nuts 12 and 14 are tightened onto bolts 8 and 10, the top half 4 and bottom half 6 of tubing clamp 2 will be drawn together around the outer tube 16 and the inner tube 18 disposed within outer tube 16. The extender tabs 22 and 24 with their flat, sharp edges 32 and 34 will first contact and then deform the sides of the tubes 18 and 16 as the top half 4 and bottom half 6 are drawn together. The sides of tubes 16 and 18 will be flattened in the regions contacted by the flat surfaces 26 and 28 of the extender tabs 22 and 24. This flattening contributes to a more perfect seal between the tubes 16 and 18 and also prevents rotation of the clamp 2 relative to tubes 16 and 18. If not for the unique flattening action of the clamp of the present invention, the clamp 2 might rotate relative to the tubes 16 and 18 as a result of forces applied during tightening, or might loosen and rotate later as a result of mechanical vibrations.

Figure 5:
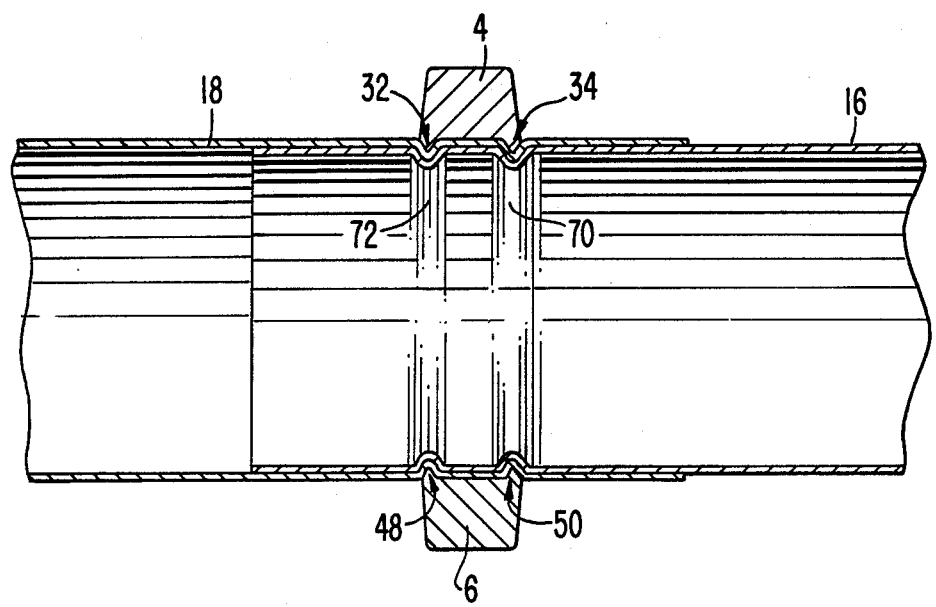
FIG. 5 is a sectional view of the clamp of FIG. 1 along section line AA.

Referring now to FIG. 5, as the tubing clamp 2 is tightened to the position shown in FIG. 1, the sharp edges 32 and 34 of top half 4 and the sharp edges 48 and 50 of bottom half 6 will bite first into the outer tube 16 and then into inner tube 18, creating deformations in the shape of annular rings. Thus, the tightening of tubing clamp 2 interlockingly deforms tubes 16 and 18 to circumferential form seals 70 and 72.

Referring again to FIG. 1, the Allen head bolts 8 and 10 are exposed in cutting regions 66 and 68 formed between the ears 36 and 38 and the ears 52 and 54 when the clamp 2 is tightened. These cutting regions result from the extender tabs 22 and 24 contacting the ears 52 and 54 to space the ears 36 and 38 therefrom. Thus, if the bolts 8 and 10 cannot be removed from the clamp 2 by loosening of the nuts 12 and 14, the bolts can be cut with a hacksaw in the cutting regions 66 and 68 to permit removal of clamp 2. Alternatively, the bolts could be cut in regions 66 and 68 with a torch, although this method is less preferred. Because of the cutting regions 66 and 68 and the stainless steel construction of the clamp 2, the clamp 2 will have a long life and can be removed and reused when exhaust system components are replaced.

While the preferred embodiment described herein includes two parallel circumferential sharp edges facing inward toward tubes 16 and 18, forming two interlocking seals between the tubes 16 and 18, a greater number of parallel circumferential sharp edges could also be used. One parallel circumferential sharp edge might also be provided, but this design is less preferred since use of plural edges produces a novel and unique series of interlocking seals between outer tube 16 and inner tube 18 rather than the single seal of prior art devices. A single seal is more likely to release exhaust gases or sounds into the environment. The provision of sharp edges around the entire circumference of tubes 16 and 18 provides more pronounced sealing regions than the rounded designs in the prior art and is a unique advantage of the present invention.

I claim:

1. A tubing clamp for connecting telescoped inner and outer tubes, said tubing clamp comprising a top portion and a bottom portion formed to surround said inner and outer tubes and having a region of contact with said outer tube, the top portion having at least one sharp inwardly-projecting edge, and the bottom portion having at least one sharp inwardly-projecting edge, said tubing clamp having two independent force-applying means for drawing said top portion and bottom portion together about the inner and outer tubes, the force-applying means operating independently of each other to draw the top portion and bottom portion together about the inner and outer tubes so that the inwardly projecting edges of the top portion and bottom portion deform the inner and outer tubes to form at least one continuous interlocking indented seal about the circumference of the inner and outer tubes, said force applying means including threaded means for connecting the top portion and bottom portion, said threaded means having a shank which is separable from the top and bottom portions of the tubing clamp and passes through holes provided in said top and bottom portions, said top and bottom portion being shaped so that a portion of the said shank is exposed when the top and bottom portions are tightened onto the tubes, such that the shank may be cut to separate the top portion and bottom portions.

2. The tubing clamp of claim 1 wherein the top portion and bottom portion each have two, spaced inwardly-projecting edges which coact when the top and bottom portions of the clamp are drawn together so as to form two continuous interlocking indented seals about the circumference of the inner and outer tubes.

3. The tubing clamp of claim 1 wherein a region of contact between the top and bottom portions and the tubes has an arcuate configuration.

4. The tubing clamp of claim 1 wherein said top portion has tab means which extend inwardly toward the tubes to form a region of contact between the top and bottom portions and the tubes which has a cross-section comprising two arcuate sections joined by two opposing flattened sides.

5. The tubing clamp of claim 1 wherein the tubing clamp is made of stainless steel.

6. The tubing clamp of claim 1, wherein said top portion includes a first top end section on one side thereof and a second top end section on an opposite side thereof and said bottom portion includes a first bottom end section on one side thereof and a second bottom end section on an opposite side thereof, said first and second top end sections being formed to substantially align with and overlie said first and second bottom end sections respectively when said top and bottom portions are tightened onto the tubes, and holes being formed in said first and second top end sections and said first and second bottom end sections to provide a first aligned pair of holes in said first top and bottom end sections and a second aligned pair of holes in said second top and bottom end sections to receive said independent force applying means when said top and bottom portions are tightened onto the tubes.

7. The tubing clamp of claim 6, wherein said threaded means includes a first threaded bolt having a shank which extends through said first aligned pair of holes and a second threaded bolt having a shank which extends through said second aligned pair of holes, said top and bottom portions being formed to provide a space between said first top and bottom end sections and a space between said second top and bottom end sections to expose a portion of a shank in each said space when said top and bottom portions are tightened onto the tubes.

8. The tubing clamp of claim 7, wherein said first and second top end sections are laterally projecting ears formed on opposite sides of said top portion and said first and second bottom end sections are laterally projecting ears formed on opposite sides of said bottom portion, at least one of said top or bottom portion being formed with extender tab means to space the laterally projecting ears of said top portion from the laterally projecting ears of said bottom portion when said top and bottom portions are tightened onto the tubes.

9. The tubing clamp of claim 8, wherein said top and bottom portions are formed to provide a region of contact between each of the top and bottom portions and the tubes which is arcuate in configuration, said extender tab means forming flat contact surfaces on opposite sides of said tubes when said top and bottom portions are tightened onto the tubes.

10. The tubing clamp of claim 7, wherein said force applying means includes nut means for rotatably engaging the shank of said first and second threaded bolts, said nut means having hand tightening means to permit the rotation of the nut means by hand and separate tool-tightening means to permit the rotation of the nut means by a tool.

11. The tubing clamp of claim 10, wherein said tool tightening means includes a shank having flat outer tool engaging surfaces and said hand-tightening means includes at least two spaced wings extending outwardly from said shank.

* * * * *